United States Patent

[11] 3,569,930

| [72] | Inventor | Teruo Hirama |
| | | Yokohama, Japan |
| [21] | Appl. No. | 758,539 |
| [22] | Filed | Sept. 9, 1968 |
| [45] | Patented | Mar. 9, 1971 |
| [73] | Assignee | Nissan Jidosha Kabushiki Kaisha |
| | | Yokohama City, Japan |
| [32] | Priority | Sept. 23, 1967, Apr. 5, 1968 |
| [33] | | Japan |
| [31] | | 42/60,834 and 43/261,740 |

[54] THEFT-PREVENTING DEVICE FOR AUTOMOBILES
5 Claims, 22 Drawing Figs.

[52] U.S. Cl. .................................................. 340/63,
200/44, 70/252, 340/52
[51] Int. Cl. ..................................................... B60r 25/02
[50] Field of Search ........................................... 340/52, 63,
64; 307/10; 180/112; 70/252; 200/44

[56] References Cited
UNITED STATES PATENTS

| 2,786,194 | 3/1957 | Hermenzie | 340/52D |
| 3,138,780 | 6/1964 | Jacobsen | 340/52D |
| 3,393,540 | 7/1968 | Rink et al. | 340/52D |

Primary Examiner—Alvin H. Waring
Assistant Examiner—Howard S. Cohen
Attorney—Sughrue, Rothwell, Mion, Zinn & MacPeak ABSTRACT: A theft-preventing device of automobiles mounted on a steering shaft casing and having a key-operated unit. The key-operated unit includes a steering shaft locking means to lock the steering shaft when said key is at a lock position, and an alarm switch to be closed unless the steering shaft is locked. A door switch is mounted on a door of the automobile, which switch is closed when the door is open. An alarm means with a power source is connected in series with the door switch and the alarm switch, so as to generate alarm sounds whenever the door is opened without locking the steering shaft.

Patented March 9, 1971

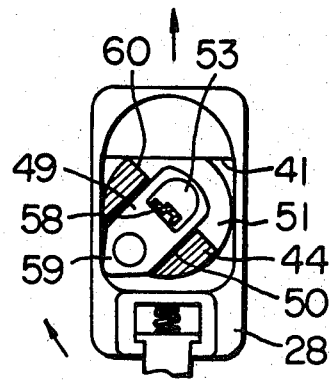
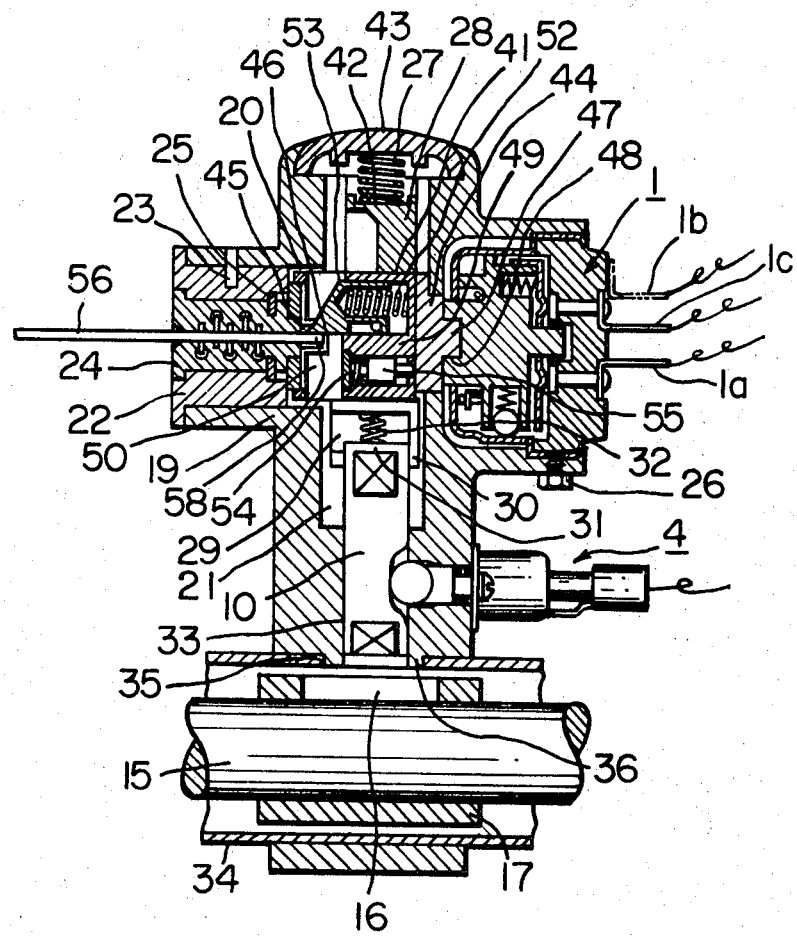

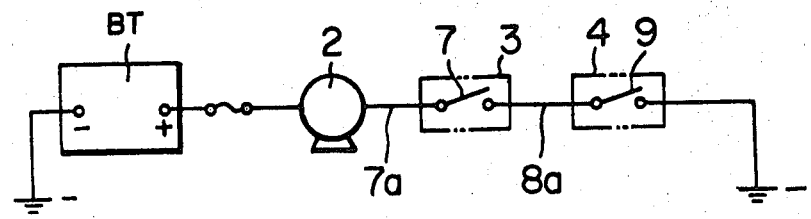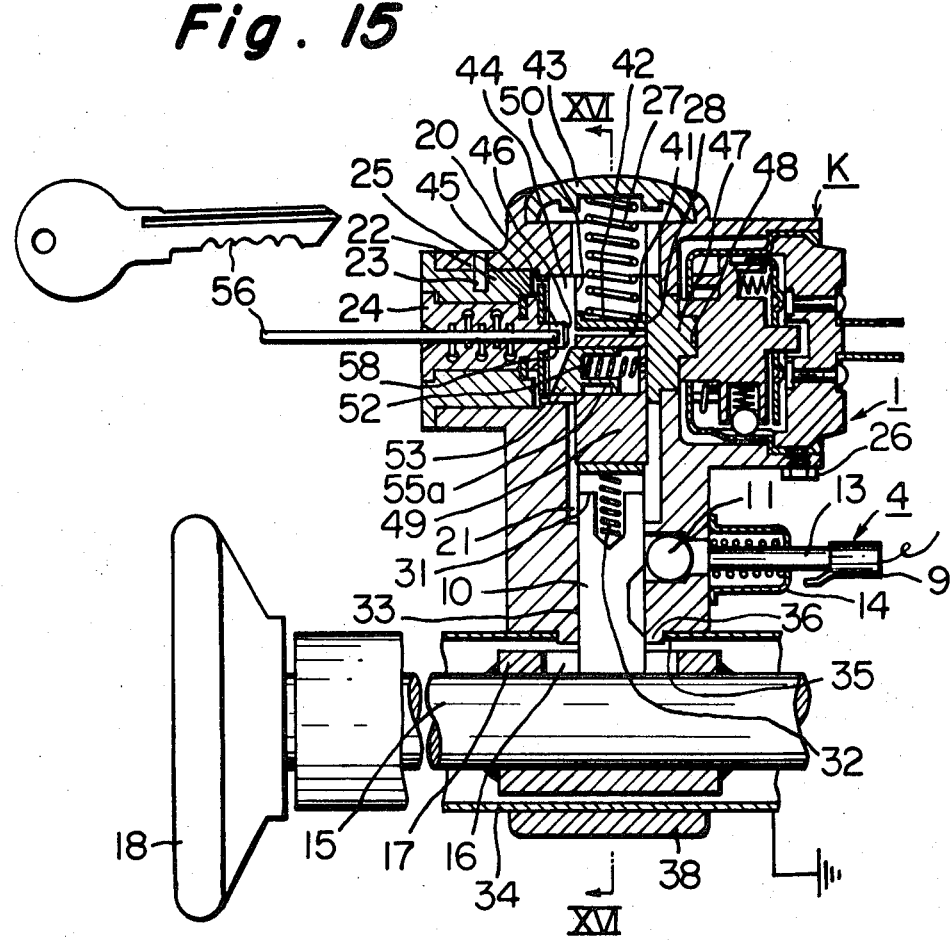

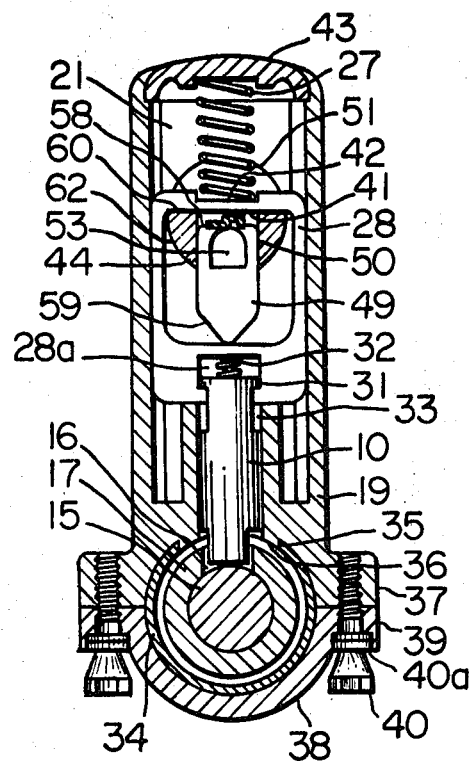
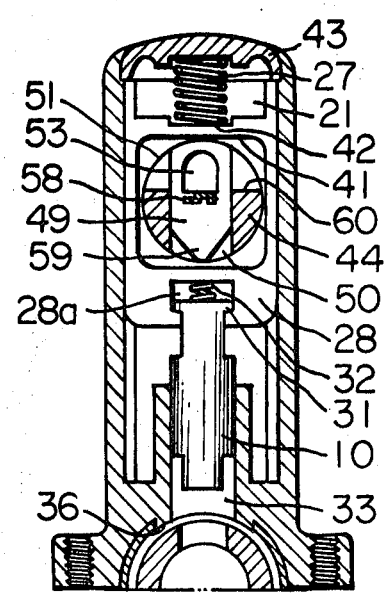
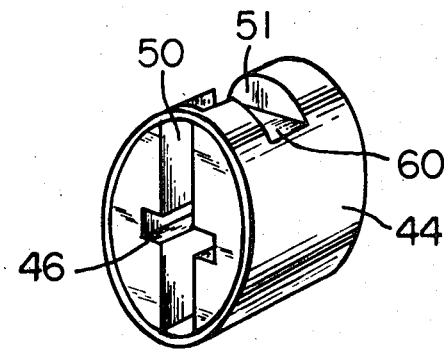

Patented March 9, 1971 3,569,930

THEFT-PREVENTING DEVICE FOR AUTOMOBILES

This invention relates to a theft-preventing device of automobiles, and more particularly to a theft-preventing device including a lock means to be operated by a key so as to selectively lock and unlock a steering shaft by a stop-claw, which key is also capable of controlling a starting switch, an ignition switch and other electric switches of automobiles.

With a known antitheft or theft-preventing device of automobile, if a driver does not actuate or forgets to actuate the theft-preventing device before leaving the automobile, the automobile thus left can possible by stolen despite the fact that a theft-preventing device is mounted thereon.

Therefore, an object of the present invention is to obviate such difficulty of known theft-preventing device by providing an improved theft-preventing device having an alarm means to give alarm sounds when a driver opens an automobile door without locking a steering shaft.

For a better understanding of the present invention, reference is made to the accompanying drawings, in which:

FIG. 12 is a schematic view of the actuating member, shown at an intermediate position during shift from a lock position to a garage position;

FIG. 13 is a sectional view, taken on the line XIII-XIII of FIG. 11;

FIG. 14 is an electric circuit diagram of another embodiment of the present invention;

FIG. 15 is a vertical sectional view of a key-operated unit of the theft-preventing device of FIG. 14, mounted on an automobile steering shaft casing;

FIG. 16 is a sectional view, taken along the line XVI-XVI of FIG. 15;

FIG. 17 is a view similar to FIG. 11, shown in the state prior to locking;

FIG. 22 is a schematic perspective view of a rotor usable in the key-operated unit of FIG. 4.

Like parts and like members are designated by like numerals and symbols throughout the drawings.

Figure 1:
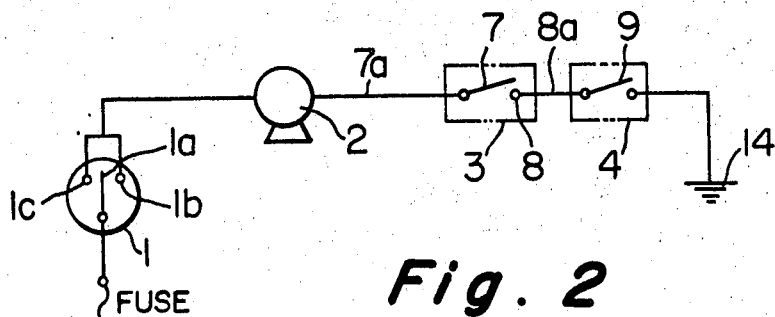
FIG. 1 is an electric circuit diagram of a theft-preventing device, according to the present invention.

In FIG. 1, the reference numeral 1 represents an engine switch, 2 an alarm buzzer, 3 a door switch, and 4 an alarm switch. The engine switch 1 is connected to a storage battery BT through a fuse, while the alarm buzzer 2, the door switch 3 and the alarm switch 4 are connected in series between the storage batteries BT and the ground.

In this embodiment of the present invention, a key-operated unit K is included, which is adapted to selectively assume the following four operative positions, depending on the angular positions of a key inserted therein: namely, start position, where a steering-shaft-locking means is not actuated, while ignition and starting circuits are closed, and the unit is automatically transferred to drive position upon release of the key from the start position; drive position, where the steering-shaft-locking means is not actuated, while the ignition circuit is closed; garage position, where the steering-shaft-locking mechanism is actuated, and the ignition circuit is interrupted; and stop position, where the steering-shaft-locking means is ready to be actuated, or the means is actuated upon removal of the key from the unit, while the ignition circuit is interrupted.

Figure 2:
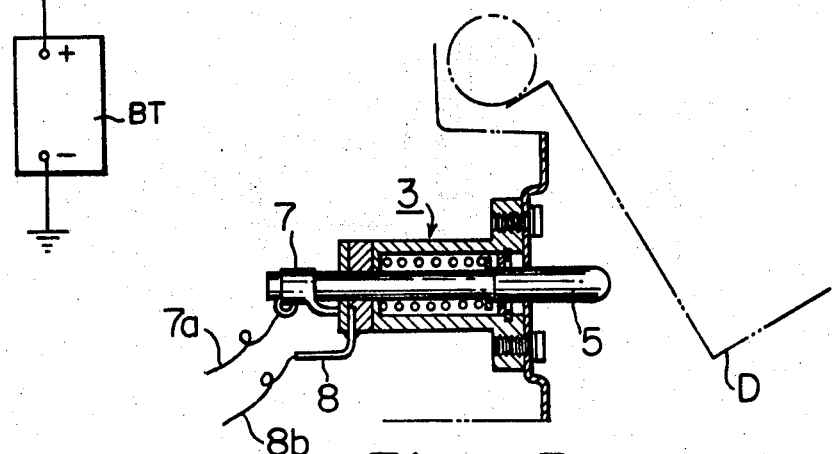
FIG. 2 is a sectional view of a door switch, with a partial view of a door cooperating with the door switch.
Figure 4:
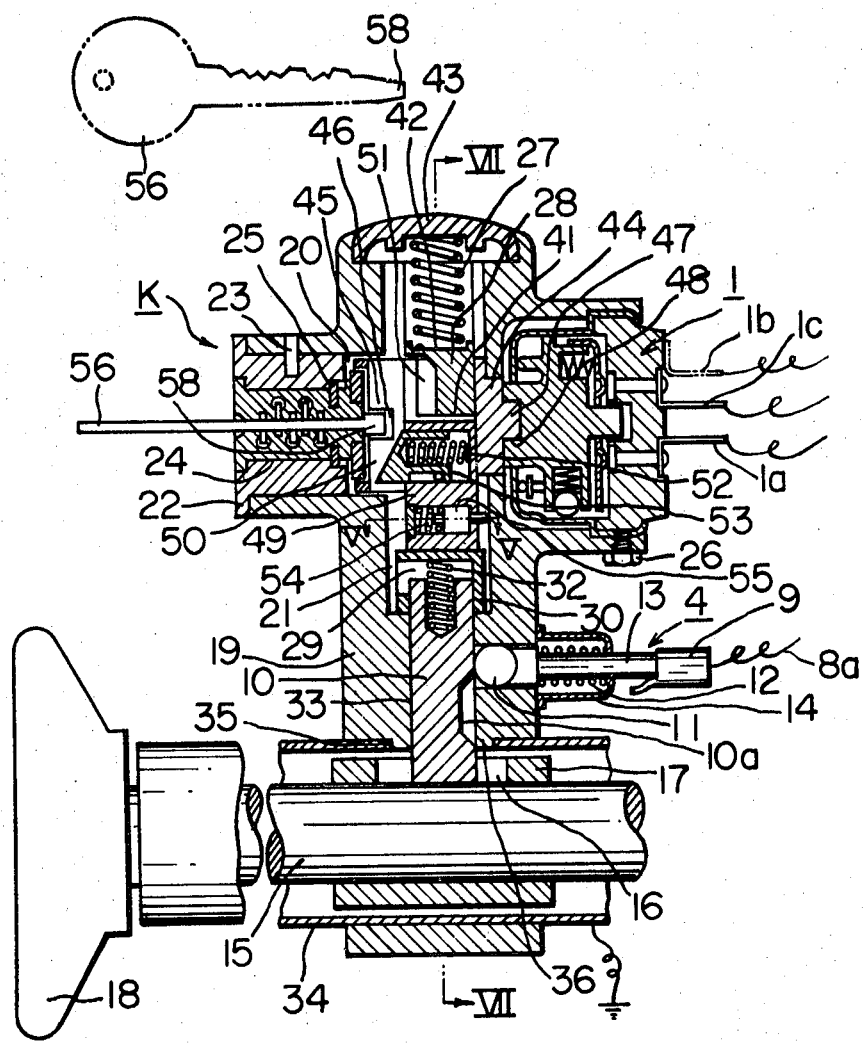
FIG. 4 is a vertical sectional view of a key-operated unit of the theft-preventing device of automobiles, according to the present invention, mounted on a steering shaft casing, shown with the steering shaft locked.
Figure 6:
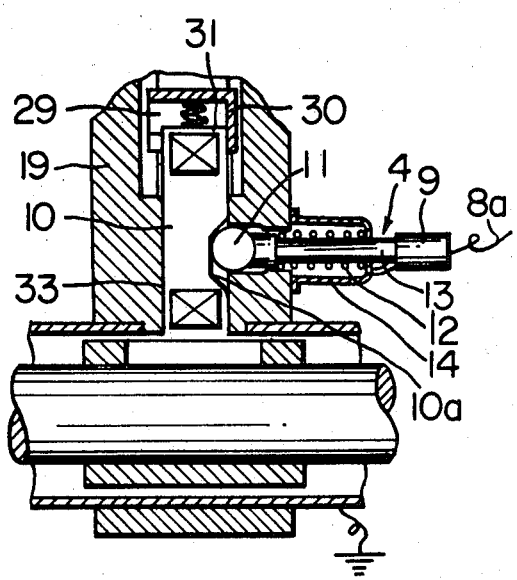
FIG. 6 is a schematic view, illustrating the operative principles of an alarm switch, usable in the theft-preventing device, according to the present invention.

As shown in FIG. 4, the engine switch 1 is adapted to rotate in conjunction with a key cylinder 24, and when a key 56 inserted into the key cylinder 24 is turned to its garage position or at its stop position, a circuit between contacts 1a or 1b or another circuit between 1a and 1c is completed. Both the contact 1b and the contact 1c are connected to the alarm buzzer 2, which is in turn connected to a movable contact 7 of the door switch 3. In the door switch 3, when a door D is open, as shown in FIG. 2, a spindle 5 is forced to move rightwards by a spring 6, so that a movable contact 7 secured to the spindle 5 is brought into contact with a terminal 8. The terminal 8 of the door switch 3 is connected to a movable contact 9 of the alarm switch 4 through a lead wire 8a. When a steering shaft 15 is not locked, as shown in FIG. 6, a check ball 11 is forced into the recessed portion 10a of a stop claw 10 by a spindle 13 actuated by a spring 12, so that a movable contact 9 is grounded through a switch body 14.

With such setup of the alarm circuitry, when a driver opens the door D after turning the key 56 to the garage or stop position without locking the steering shaft 15, a current flows through the alarm buzzer 2. Thus, alarm sounds are produced when the driver is going to leave the automobile while forgetting to lock the steering shaft 15.

Figure 3:
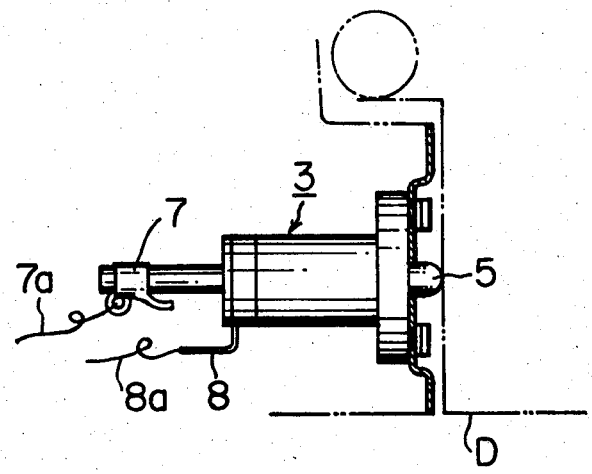
FIG. 3 is a schematic view of the door switch, shown with the door located at its closed position.

Referring to FIG. 3, when the door D is closed, the spindle 5 of the door switch 3 is urged leftwards by the door D, so that the movable contact 7 is separated from the terminal 8 to interrupt the current through the alarm buzzer 2.

Referring to FIG. 4, when the steering shaft 15 is locked, the spindle 13 of the alarm switch 4 is forced rightwards by the check ball 11, which is now engaged with the left surface of the stop claw 10, instead of the recessed portion 10a thereof. Thus, the movable contact 9 secured to the spindle 13 is separated from the body 14, to break the circuit through the alarm buzzer 2.

The body 14 of the alarm switch 4 is mounted on the cylindrical housing 19 of a key-operated unit K of the theft-preventing device in such manner that the check ball 11 cannot be removed from the housing 19 unless the stop claw 10 is separated from the theft-preventing device. Accordingly, when the steering shaft 15 is locked, it is impossible to unlock the steering shaft 15 without using the key 56, even though the alarm switch 4 may be removed from the unit K. In other words, the stop claw 10 cannot be moved from its locked position without using the key 56. Thus, the automobile is protected from stealing.

Figure 7:
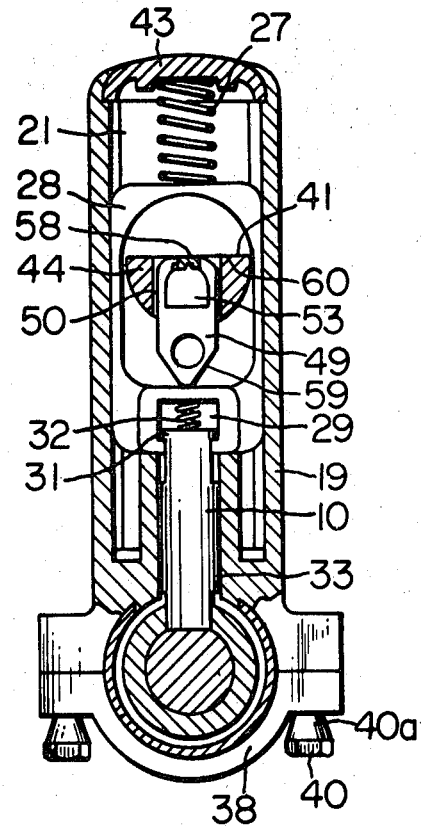
FIG. 7 is a sectional view, taken along the line VII-VII of FIG. 4.

The detailed construction of the key-operated unit K of the theft-preventing device of the present invention will not be described. In FIG. 4, a sleeve 17 having a notch 16 is secured to the steering shaft 15 by welding or bolts. A steering wheel 18 is integrally connected to the steering shaft 15 at one end thereof. As shown in FIG. 7, a registering boss 36 of the housing 19 is fitted in a cooperating opening 35 bored on the steering shaft casing 34. A flange 37 is formed at the lower end of the housing 19, so that the cooperating flange 39 of a cap 38 can be joined to the flange 37 by bolts 40, with the casing 34 held between the housing 19 and the cap 38. Each bolt 40 has a neck portion 40a, so that the head portion of the bolt can be wrenched off after the cap 38 is fastened to the housing 19. By wrenching off the head portions of all the bolts 40 fastening the cap 38 to the housing 19, the key-operated unit K of the theft-preventing device becomes unseparable from the steering shaft casing 34. In other words, with the head portions of the bolts 40 thus wrenched off, the cap 38 cannot be removed from the housing 19 by any conventional screw drivers, wrenches, or other simple tools.

There are a horizontal hole 20 and a vertical hole 21 formed in the housing 19, which are communicated with each other. A key cylinder case 22 is secured to one end of the horizontal hole 20 of the housing 19 by knock pins 23. The key cylinder 24 is rotatably secured in the key cylinder case 22 by a stop ring 25. The engine switch 1 is secured to the housing 19 by one or more bolts 26, at the opposite end of the horizontal hole 20.

The construction of the engine switch 1 is such that the switch 1 is removable from the housing 19 of the key-operated unit K of the theft-preventing device. However, the steering shaft 15 cannot be unlocked without the key 56, even after the switch 1 is separated from the housing 19. In other words, as shown in FIG. 7, an actuating member 28 is fitted in the vertical hole 21 and always urged downwards by a spring 27. The actuating member 28 is in the form of hollow frame and adapted to vertically reciprocate in the vertical hole 21 of the housing 19. A dovetail groove 28a is formed at the lower end of the actuating member 28, and a flange 31 at the upper end of the stop claw 10 is fitted in the dovetail groove 28a and held therein by a spring 32. The stop claw 10 has an alarm switch actuating surface 30 on one side thereof. The stop claw 10 extends through a hole 33 communicating with the vertical hole 21, so that the lower end of the stop claw 10 is engageable with the notch 16 of the sleeve 17 secured to the steering shaft 15. A recess 42 is formed at the upper outer surface of the actuating member 28, while a flat surface 41 is formed on the inner wall of the upper end of the actuating member 28. The spring 27 is inserted between the thus formed recess 42 and a lid 43 secured to the housing 19. A rotor 44 is fitted to the inside space of the actuating member 28, which moves together with the engine switch 1 and the key cylinder 24.

More particularly, a projection 45 issuing from the inner end of the key cylinder 24 fits in a groove 46 formed on the left hand surface of the rotor 44, while a boss 47 is formed on the right hand surface of the rotor 44, so as to fit in a recess 48 of the engine switch 1. Accordingly, the key cylinder 24, the rotor 44, and the engine switch 1 are interconnected with each other and rotate together as an integral unit.

The rotor 44 has a diametrical groove 50 through which a plunger 49 reciprocates, and a shoulder 51 which engages the flat portion 41 at the inner top surface of the actuating member 28. In the plunger 49, there are provided a stopper 53 movable in the axial direction of the rotor 44 by a spring 52, a pin 55 in the same direction as the stopper 53 by another spring 54.

The operation of the key-operated unit K of the theft-preventing device, according to the present invention, will now be described, for each operative position of the key 56.

FIG. 4 shows the key-operated unit K in the state as locked with the key 56 set at the lock position thereof. When the key 56 is at the lock position, the springs 27 and 32 force the stop claw 10 downwards, regardless of whether the stop claw 10 is engaged with the notch 16 of the sleeve 17 or not. If the stop claw 10 is not engaged with the notch 16 when the key 56 is turned to the lock position, the stop claw 10 moves into the notch 16 as the steering shaft 15 rotates, so that the steering shaft 15 can eventually be locked. As the steering shaft 15 is locked, the circuit of the engine switch 1 is completed, to close the engine switch portion of the alarm buzzer circuit. It is preferable to interrupt the ignition circuit when the key 56 is at the stop or lock position.

The construction of the key cylinder 24 is such that the key 56 can be inserted into and removed from the key cylinder 24, only when the key 56 is at either the stop and lock position (FIGS. 7 and 11) or the garage position (FIG. 8) thereof.

Figure 5:
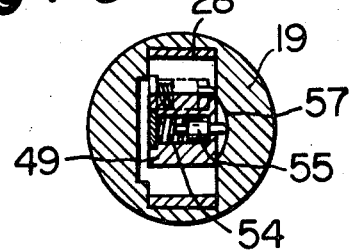
FIG. 5 is a sectional view of the key-operated unit, taken along the line V-V of FIG. 4.
Figure 8:
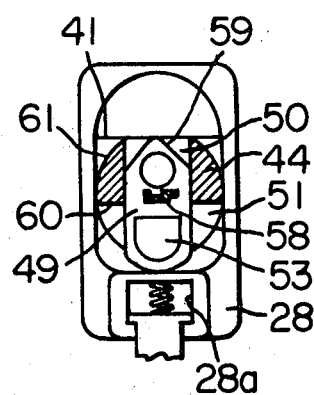
FIGS. 8 to 10 are schematic views of an actuating member, shown at different operative positions, respectively.

In order to unlock the steering shaft 15, the key 56 is turned clockwise from the lock position, as shown in FIG. 7, to the garage position, as shown in FIG. 8. FIG. 12 shows an intermediate position between the lock position and the garage position. As the key 56 is turned clockwise from the lock position, the rotor 44 and the plunger 49 are also rotated together with the key 56, and the pin 55 of the plunger 49 moves along the guide surface 57 formed on the inner surface of the housing 19, until the pin 55 is entirely depressed into the plunger 49, as best shown in FIG. 5 by dash-dot lines. Thus, the pin 55 does not strike the peripheral surface of the rotor 44, and the plunger 49 is forced into the rotor 44 along the diametrical groove 50 thereof when the plunger is forced upwards, as seen in FIG. 6. On the other hand, as the rotor rotates clockwise, the edge 60 of the shoulder 51 engages the flat portion 41 at the inner upper end of the actuating member 28, so as to raise the actuating member 28, as shown in FIG. 12. At the same time the pointed portion 59 of the plunger 49 is forced upwards by the spring 32, until the plunger is entirely forced into the actuating member 44, as shown in FIG. 8. In the garage position of FIG. 8, the actuating member 28 is held at the raised position by the nonshouldered periphery 61 of the rotor 44, so that the steering shaft 15 is held unlocked.

It should be noted here that in turning the rotor 44 from the lock position (FIG. 7) to the garage position (FIG. 8), the slanted end surface of the stopper 53 engages the tip 58 of the key 56 and depressed into the diametrical groove 50 bored on the rotor 44. Thereby, the stopper 53 passes through the center of the rotor 44 or passes through the tip 58 of the key 56. In other words, in the lock position, both the stopper 53 and the pin 55 are located on the same side of or lower side of the key 56, as shown in FIG. 7, while in the garage position, the stopper 53 and the pin 55 are located on the opposite sides of the key 56, as shown in FIG. 8.

Referring to FIG. 4, when the rotor 44 is at the lock position, the pin 55 fitted in the plunger 49 projects itself out of the right hand edge surface of the plunger 49, so that the thus projecting portion is engageable with the peripheral edge of the rotor 44 as the stop claw tends to move upwards. Thereby, the pin 55 acts to limit the upward movement of the stop claw 10, as long as the rotor 44 is at the lock position. The pin 55 also acts to prevent chattering of the plunger 49.

As the stop claw 10 is moved to the unlocked position, the movable contact 9 of the alarm switch 4 is grounded through the casing 14 thereof, as shown in FIG. 13, so that the alarm switch portion of the automobile buzzer circuit is closed. An ignition circuit of the automobile is adapted to be kept open, when the key 56 is at the garage position.

Figure 9:
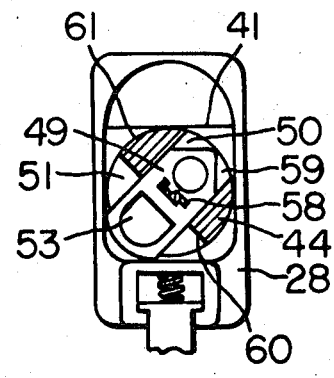
Figure 10:
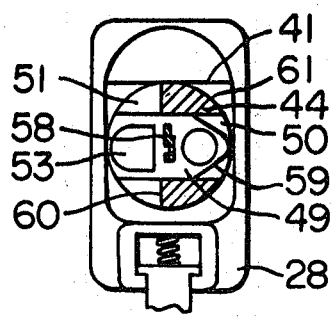

In order to start the automobile engine, the key 56 is turned to the start position, as shown in FIG. 10, and once the automobile engine is started, the key 56 is turned to the drive position, as shown in FIG. 9. In both the start and drive positions, nonshouldered peripheral portion 61 of the rotor 44 holds the flat portion 41 of the actuating member 28 at its raised position, so that the stop claw 10 is kept away from the notched sleeve 17 to keep the steering shaft 15 unlocked. When the key is at the start or drive position, the circuit to energize the alarm buzzer 2 is interrupted at the engine switch 1, while the ignition circuit of the automobile engine is completed. The circuit for starting the automobile engine is completed only when the key 56 is at the start position, but interrupted upon turning the key to the drive position.

Figure 11:
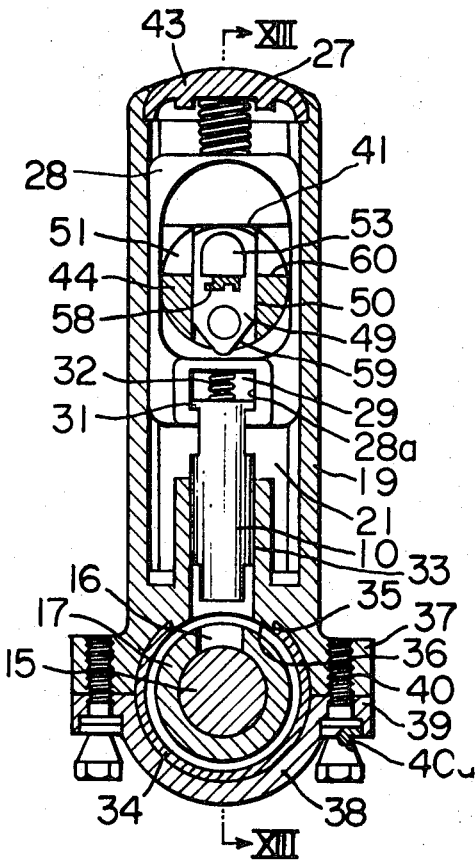
FIG. 11 is a sectional view similar to FIG. 7, shown at a stop position thereof.

To stop the automobile engine, the key is turned to the stop position, as shown in FIG. 11, so as to interrupt the ignition circuit of the engine. Referring to FIG. 13, illustrating a sectional view taken along the line XIII–XIII of FIG. 11, the tip 58 of the key 56 engages the lower surface of the stopper 53 to hold the plunger 49 at the raised position, so that the nonpointed end portion of the plunger 49 engages the flattened portion 41 of the actuating member 28. Thus, the actuating member 28 is kept at the raised position, and the stop claw 10 is also kept away from the notch 16 of the sleeve 17 secured to the steering shaft 15. Thus, the steering shaft 15 is kept unlocked. When the key 56 is removed from the key cylinder 24, the plunger 49 is forced downwards by the spring 27 through the actuating member 28, so that the flat portion 41 of the actuating member 28 engages the shoulder 51 formed on the rotor 44. Accordingly, the stop claw 10 sticks out of the housing 19 through the hole 33 at the boss 36, and engages the notch 16 formed on the sleeve 17 secured to the steering shaft 15. Thus, the steering shaft 15 is locked, as shown in FIG. 4.

In the preceding embodiment, the alarm buzzer is energized only when the locking is forgotten with the key at the garage of stop position. In the following embodiment, alarm sounds are produced with the key held at any operative position, if a driver is going to leave an automobile without locking the steering shaft thereof.

In FIG. 15, the construction of a key-operated unit of the second embodiment is such that the key is removable from the unit only when the key is at the garage or stop position, but it cannot be removed from the unit as long as it assumes any other operative position. It is also possible to use such construction for inhibiting the removal of the key when it assumes the garage position.

In FIG. 14, an alarm buzzer 2 is connected to batteries BT through a door switch 3 and an alarm switch 4. The door switch 3 can be the same as that shown in FIG. 2, while the alarm switch 4 can be of the same construction as that shown in FIG. 6, and both the door and the alarm switches can be incorporated in a key-operated unit K, as shown in FIG. 15.

The electric circuit of the alarm buzzer 2 traces from the earth, through the batteries BT, the alarm buzzer 2, the door switch 3, and the alarm switch 4, and back to the earth. As described in detail in the foregoing, referring to FIGS. 2 and 6, the circuit of the door switch 3 is closed when the door D is open, while the circuit of the alarm switch 4 is closed as long as automobile steering shaft is unlocked. Accordingly, whenever a driver opens the automobile door having the door switch 3 without locking the steering shaft, the alarm buzzer 2 is actuated to produce alarm sounds, so as to remind the driver of the fact that the steering shaft is not locked and the automobile is not properly protected.

FIG. 15 shows the construction of a key-operated unit, including a key cylinder, a steering-shaft-locking means, an alarm switch, and an engine switch. When a steering shaft 15 is locked, as shown in the FIG., a check ball 11 of the alarm switch 4 engages nonrecessed peripheral surface of the stop claw 10, so as to force a spindle 13 rightwards. Thereby, a movable contact 9 secured to the tip of the spindle 13 is separated from body 14 of the alarm switch 4, and the circuit of the alarm switch is interrupted. Upon unlocking the steering shaft 15, the stop claw 10 is raised, and the check ball 11 fits in a recessed portion 10a of the stop claw 10, so as to allow the leftward movement of the spindle 13 to complete the circuit through the alarm switch 4.

The construction of the key-operated unit K is such that, the check ball 11 cannot be removed from housing 19 of the unit unless the stop claw 10 is separated from the housing 19, and hence, although the alarm switch 4 may be separable from the key-operated unit K, the locking of the steering shaft 15 cannot be released without a key 56. Thus, the automobile is protected from stealing.

More particularly, a sleeve 16 having a notch 17 formed thereon is secured to the steering shaft 15 by welding or by bolts. A steering wheel 18 is integrally secured to the steering shaft 15 at one end thereof. As illustrated in FIG. 16, the housing 19 of the key-operated unit K has a boss 36, which is fitted in the opening 35 bored on a steering shaft casing 34. A flange 37 is formed at the lower end thereof, so that the cooperating flange 39 of a cap 38 can be fastened to the flange 37 of the housing 19 by bolts 40. Thereby, the entire key-operated unit K is secured to the steering shaft casing 34. After the fastening, the head of the bolts 40 can be wrenched off at the neck portion 40a thereof. Thus, the key-operated unit can be mounted on the steering shaft casing 34 in an inseparable manner.

The housing 19 has a horizontal hole 20 and a vertical hole 21 formed therein. A key cylinder 24 is secured to the one end of the horizontal hole 20 by knock pins 23, and a stop ring 25 acts to hold the key cylinder 24 in the cylinder case 22 in a rotatable fashion. An engine switch 1 is mounted on the opposite end of the horizontal hole 20 of the housing 19 by bolts 26. The engine switch 1 is removable from the housing 19, however, the steering shaft 15 cannot be unlocked without using the key 56, even after removing the engine switch 1. As shown in FIG. 16, an actuating member 28 fits in the vertical hole 21 and a spring 27 is inserted between the actuating member 28 and the upper end of the housing 19, so as to force the actuating body 28 downwards. The actuating member 28 is of hollow framelike structure, and adapted to reciprocate vertically through the vertical hole 21. A dovetail groove 28a is formed at the lower end of the actuating member 28, and a flange 31 formed at the upper end of the stop claw 10 is fitted in the dovetail groove 28a and secured thereto by a spring 32. The stop claw 10 extends through a hole 33 communicated with the vertical hole 21 of the housing 19, and is engageable with the sleeve 17 secured to the steering shaft 15. A flat portion 41 is formed at the inside of the upper end of the actuating member 28, while a recess 42 is bored on the top surface of the actuating member 28. The lower end of the spring 27 fits in the recess 42, while the upper end of the spring 27 engages a lid 43 secured to the housing 19. A rotor 44 is inserted in the actuating member 28. A recess 46 is bored on the left hand end surface of the rotor 44, and a projection 45 issuing from the right hand end surface of the key cylinder 24 fits in the recess 46, while a boss 47 is formed on the right hand end surface of the rotor 44, which fits in another recess 48 at the left hand end surface of the engine key 1. Thereby, the key cylinder 24, the rotor 44, and the engine switch 1 are interconnected together and rotate simultaneously as an integral body.

The rotor 44 has a diametrical groove 50 through which a plunger 49 reciprocates, and a shoulder 51 on which the flat portion 41 at the inner upper end of the actuating member 28 is restable. In the plunger 49, there are provided a stopper 53 biased leftwards by a spring 52 and a stop pin 55a. The stop pin 55a acts to limit the leftward movement of the stopper 53 at the position as shown in FIG. 14.

The operation of the key-operated unit K will now be described in detail for each operative position of the key 56. FIGS. 15 and 16 show the unit K with the key 56 turned to the lock position. With the key 56 at the lock position, the springs 27 and 32 urge the stop claw 10 downwards, so that the stop claw 10 engages the notch 16 formed on the sleeve 17 secured to the steering shaft 15, as the steering shaft 15 rotates. Thus, the steering shaft 15 is locked. The construction of the engine switch 1 is such that the ignition circuit of the engine is interrupted when the key 56 is turned to the lock position. The key cylinder 24 is so constructed that the key 56 is removable therefrom when the key 56 is at the garage position (FIG. 19) or at the stop position (FIG. 17).

Figure 18:
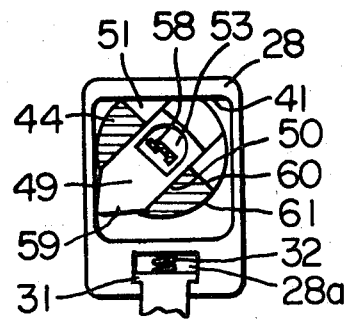
FIG. 18 is a partial sectional view of an actuating member, shown at an intermediate position while raising a stop claw.
Figure 19:
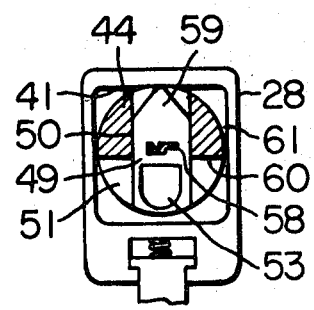
FIGS. 19 to 21 are partial sectional views, illustrating different operative positions of the key.

In order to unlock the steering shaft 15, the key 56 is turned to the garage position, as shown in FIG. 19, through an intermediate angular position, as shown in FIG. 18. Then, the rotor 44 is turned together with the key 56, and the pointed portion 59 of the plunger 49 slides along the inner peripheral surface of the actuating member 28, so as to be forced into the rotor 44 along the diametrical groove 50. Accordingly, the tip portion 58 of the key 56 engages the slanted portion of the stopper 53, and since the key 56 is held stationary, the stopper 53 is forced rightwards, as seen in FIG. 15. Eventually, the stopper 53 passes through the key tip 58, as shown in FIG. 19. Upon passing through the key tip 58, the stopper 53 again moves leftwards to the position as shown in FIG. 15. At the same time, the edge 60 of the shoulder 51 engages the flat portion 41 of the actuating member 28 so as to raise the actuating member 28, until the stop claw is removed from the notch 16 of the sleeve 17 secured to the steering shaft 15. Thus, the steering shaft 15 is unlocked. The engine switch 1 is adapted to interrupt the ignition circuit, when the key 56 is turned to the garage position.

Figure 20:
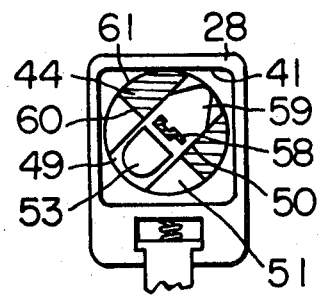
Figure 21:
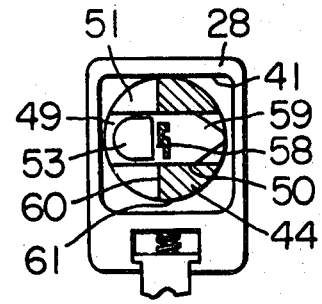

When the key 56 is at the drive position (FIG. 20) or at the start position (FIG. 21), the nonshouldered peripheral edge portion 61 engages the flat portion 41 to hold the stop claw 10 as raised into the housing 19 or to keep the steering shaft 15 unlocked. The ignition circuit is kept closed at the start and the drive positions of the key 56, while a start circuit is complete only when the key 56 is turned to the start position (FIG. 21). The start circuit is interrupted when the key 56 is at any position other than the start position.

To stop the automobile engine, the key is turned to the stop position, as shown in FIG. 17, so that the ignition circuit is interrupted. At this position, the key tip 58 engages the lower surface of the stopper 53, and the flat portion 41 at the inner top end of the actuating member 28 is held by the nonpointed end portion of the plunger 49, so that the stop claw 10 is kept away from the notch 16 of the sleeve 17 secured to the steering shaft 15 and the steering shaft 15 is left unlocked. As soon as the key 56 is removed from the key cylinder 24, the plunger 49 is forced downwards by the spring 27 through the actuating member 28, so that the flat portion 41 of the actuating member 28 engages the shoulder 51 of the rotor, to move the stop claw 10 toward the notch 16 through the hole 33 of the housing 19. Thus, the lower end of the stop claw 10 fits in the notch 16 and the steering shaft 15 is locked, as shown in FIG. 15.

As described in the foregoing, according to the preceding embodiment, alarm sounds are produced when a driver is going to leave an automobile without locking the steering shaft thereof, while keeping the key at any operative position, or while keeping a key at its garage or stop position. Thus, the automobile is protected from being left unlocked and from possible theft. The theft-preventing device according to the present invention can be mounted on the steering shaft casing 34, without disassembling the steering wheel. Once the device is mounted on the steering shaft casing, it is very difficult to remove the device therefrom, so that the device cannot easily be disassembled by a theft.

Furthermore, the locking of the steering shaft is done simply by withdrawing a key from a key cylinder at its stop position. Since the automobile engine operation is also interrupted by turning the key to the stop position, the protection of the automobile from thefts can be done very easily in a highly reliable manner.

I claim:

1. A theft-preventing device of automobiles mounted on a steering shaft casing and comprising:
   a key;
   a key-operated unit consisting of a steering shaft locking means to lock a steering shaft of an automobile when the key is at a lock position, and an alarm switch having an alarm switch circuit to be completed unless said steering shaft is locked;
   a door switch mounted on a door of the automobile and having a door switch circuit to be completed on each opening said door;
   an alarm means having a series-connected electric power source; and
   an electric loop circuit including said alarm means, said door switch circuit, said alarm switch circuit, and said power source, all connected in series; whereby alarm sounds are produced whenever said door is opened without locking the steering shaft, regardless of the operative position of said key.

2. A theft-preventing device according to claim 1 and further comprising an engine switch mounted on said key-operated unit and having an engine switch circuit to be closed when said key is at a garage position and a stop position, said engine switch circuit being inserted in series to said loop circuit, whereby alarm sounds are produced whenever said door is opened without locking the steering shaft while holding the key to the garage and the stop position.

3. A theft-preventing device according to claim 1, wherein said steering shaft has a sleeve with a notch secured thereto, and said locking means of the key-operated unit has a stop claw engageable with said notch when said key is at said lock position.

4. A theft-preventing device according to claim 3, wherein said key-operated unit has a stop claw connected to a hollow actuating member secured at the upper end thereof, a rotor fitted in the inner space of said actuating member and having a shoulder portion adapted to receive the inner wall of the upper edge of said hollow actuating member, said rotor further having a diametrical groove, a plunger slidably fitted in said diametrical groove and having a stopper fitted in said plunger while being biased away from the plunger, and a spring inserted between the top surface of said actuating member and inner surface of the top of housing of said key-operated unit; whereby, with said key held at the lock position, the upper end of the actuating member engages said shoulder of said rotor so as to occupy a lowered position to allow engagement of the stop claw with the notch of the steering shaft to lock the steering shaft; when said key is held at a garage position, the middle point of the nonshouldered peripheral edge portion of the rotor holds said actuating member at a raised position to keep the stop claw away from the notch of the steering shaft, so as to unlock said steering shaft; with said key held at a drive and a start position, intermediate points of the nonshouldered peripheral edge portion of the rotor hold said actuating member at said raised position to keep the steering shaft unlocked; and with said key held at a stop position, the tip of said key holds the lower surface of said stopper, so that the upper portion of said actuating member is held at said raised position by said plunger, while upon removal of said key, the plunger is released from said key to allow the movement of said stop claw toward said steering shaft for locking the steering shaft.

5. A theft-preventing device according to claim 1, wherein said alarm switch has a spindle, a movable contact secured to said spindle, a stationary contact secured to the housing of said alarm switch, a check ball located at the lower end of said spindle and engageable with a certain predetermined recessed portion of said stop claw, and a spring biasing said spindle toward said stop claw.